US 6,623,867 B2

(12) United States Patent
Crocco et al.

(10) Patent No.: US 6,623,867 B2
(45) Date of Patent: Sep. 23, 2003

(54) REINFORCED ALUMINUM METAL COMPOSITE CARRIER

(75) Inventors: Frank Victor Crocco, Washington, MI (US); Jonathan Mark Adler, Dexter, MI (US); Nicholas James Gianaris, West Bloomfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 50 days.

(21) Appl. No.: 09/904,784

(22) Filed: Jul. 13, 2001

(65) Prior Publication Data

US 2003/0012976 A1 Jan. 16, 2003

(51) Int. Cl.[7] .............................. B32B 3/10; B32B 5/02; B32B 7/02; B32B 15/20
(52) U.S. Cl. ....................... 428/614; 428/627; 428/629; 428/654; 428/539.5; 74/606 R
(58) Field of Search ................. 428/614, 627, 428/629, 654, 539.5; 74/606 R

(56) References Cited

U.S. PATENT DOCUMENTS

| 5,028,494 A | | 7/1991 | Tsujimura et al. | |
|---|---|---|---|---|
| 5,163,498 A | * | 11/1992 | Kantner et al. | 164/97 |
| 5,524,699 A | * | 6/1996 | Cook | 164/97 |
| 5,887,684 A | * | 3/1999 | Doll et al. | 188/71.1 |
| 5,906,253 A | * | 5/1999 | Rancourt et al. | 188/264 AA |
| 6,196,363 B1 | * | 3/2001 | Wall | 188/218 R |
| 6,352,294 B1 | * | 3/2002 | Morita et al. | 295/31.1 |
| 6,412,879 B1 | | 7/2002 | Ogoniek et al. | |

FOREIGN PATENT DOCUMENTS

JP 1254366 10/1989

* cited by examiner

Primary Examiner—John J. Zimmerman
Assistant Examiner—Jason L. Savage
(74) Attorney, Agent, or Firm—Brinks Hofer Gilson & Lione

(57) ABSTRACT

The present invention is generally directed towards a carrier of a motor vehicle. The carrier is formed of a first portion and the second portion. The first portion is made of aluminum having ceramic particles reinforcing the aluminum matrix. The second portion is made of unreinforced aluminum metal or metal alloy. Preferably the second portion is present in form of discrete pockets in the first portion and is adapted to be machined or welded.

14 Claims, 5 Drawing Sheets

REINFORCED ALUMINUM METAL COMPOSITE CARRIER

TECHNICAL FIELD OF THE INVENTION

This invention generally relates to a carrier in an axle assembly of a motor vehicle. More specifically, this invention relates to a carrier made of aluminum reinforced with ceramic particles installed in the axle assembly of a motor vehicle.

BACKGROUND OF THE INVENTION

Most vehicles use at least one gearset to transfer torque between rotating shafts or other components that rotate around different axes. For example, the axle of a rear wheel drive vehicle includes a pinion gear rotating around a generally longitudinal axis and driven by torque from the transmission coupled to a ring gear which rotates around a generally transverse axis and drives torque into the differential. In the case of some four wheel drive vehicles with transverse-mounted engines, a perpendicular axis or skew axis gearset within a power take-off unit is used to transfer torque from the transverse axis of the engine and transmission to the longitudinal axis of a driveshaft Typically, the carrier that supports the differential case and the gear set is made of magnesium, aluminum or cast iron. The gears themselves are made of steel. Typically, these gearsets are sensitive to changes or inaccuracies in the positions of the gears. Even small deflections can lead to noise and premature gear failure. Since the operating temperatures are relatively high, differences in thermal expansion between the carrier and the gears can lead to such deflections as the temperature of the axle assembly changes. Applications in which the temperature range is expected to be broad must then use in the carrier a material with low thermal expansion, such as cast iron. The use of cast iron makes the axle assembly heavy.

In the present invention, a carrier made of an aluminum reinforced with ceramic particles allows for a lower thermal expansion and for a stable carrier in the axle assembly. Further, the low thermal expansion of the carrier reduces the deflection and prevents noise and premature failure of the gearsets. In addition, the carrier made of aluminum matrix reinforced with ceramic particles is much lighter thereby reducing the overall weight of the motor vehicle.

BRIEF DESCRIPTION OF THE DRAWINGS

Further features and advantages of the invention will become apparent from the following discussion and the accompanying drawings in which.

DETAILED DESCRIPTION OF THE INVENTION

The following description of the preferred embodiment is merely exemplary in nature and is in no way intended to limit the invention or its application or uses.

Figure 1:
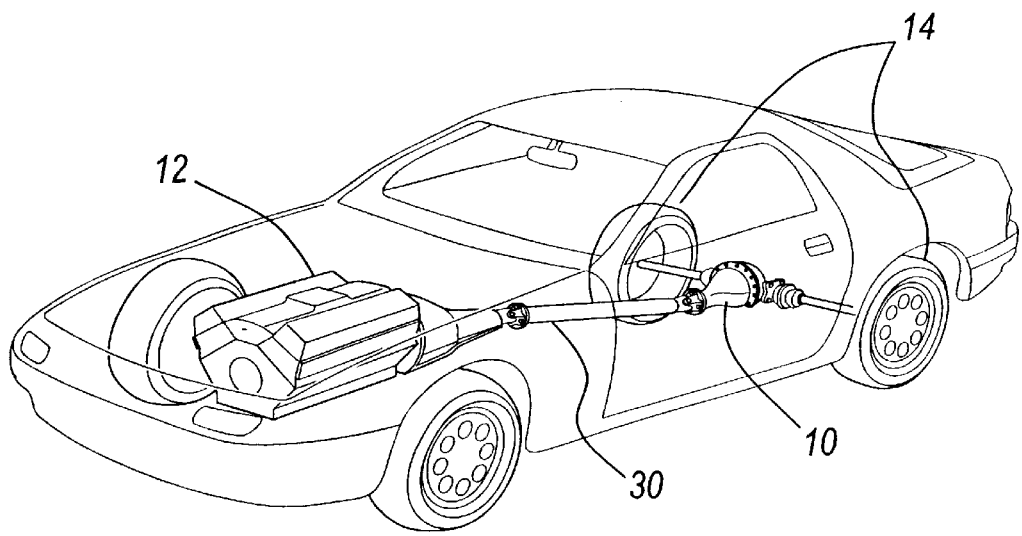
FIG. 1 is a perspective representation of the axle assembly as installed in a motor vehicle in accordance with the teachings of the present invention.

Referring in particular to the drawings, an axle assembly incorporating the reinforced aluminum carrier of the present invention in accordance with the teachings of the present invention is designated by reference 10. As shown in FIG. 1, the axle assembly 10 is installed in the under body of a motor vehicle and serves to transmit the power from the engine 12 to the wheels 14.

Figure 2:
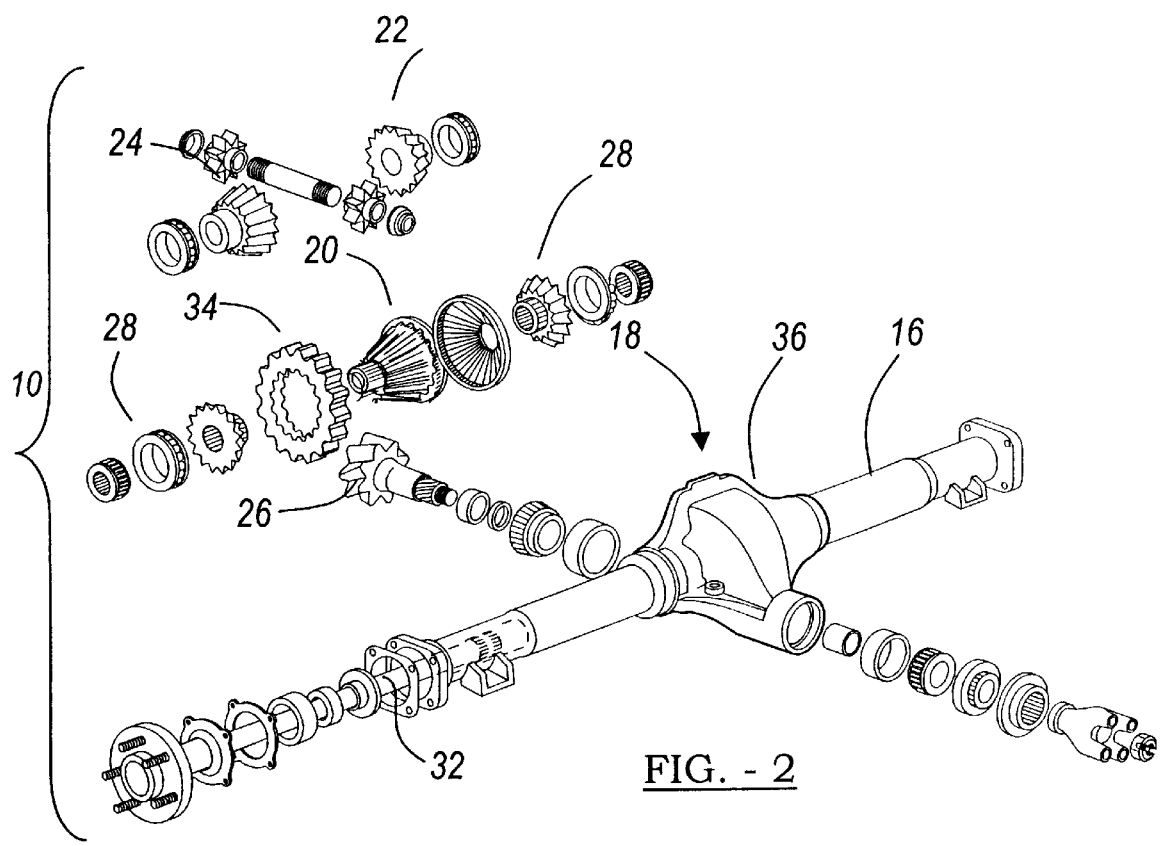
FIG. 2 is an exploded view of the axle assembly having the carrier installed in a motor vehicle in accordance with the teachings of the present invention.
Figure 3:
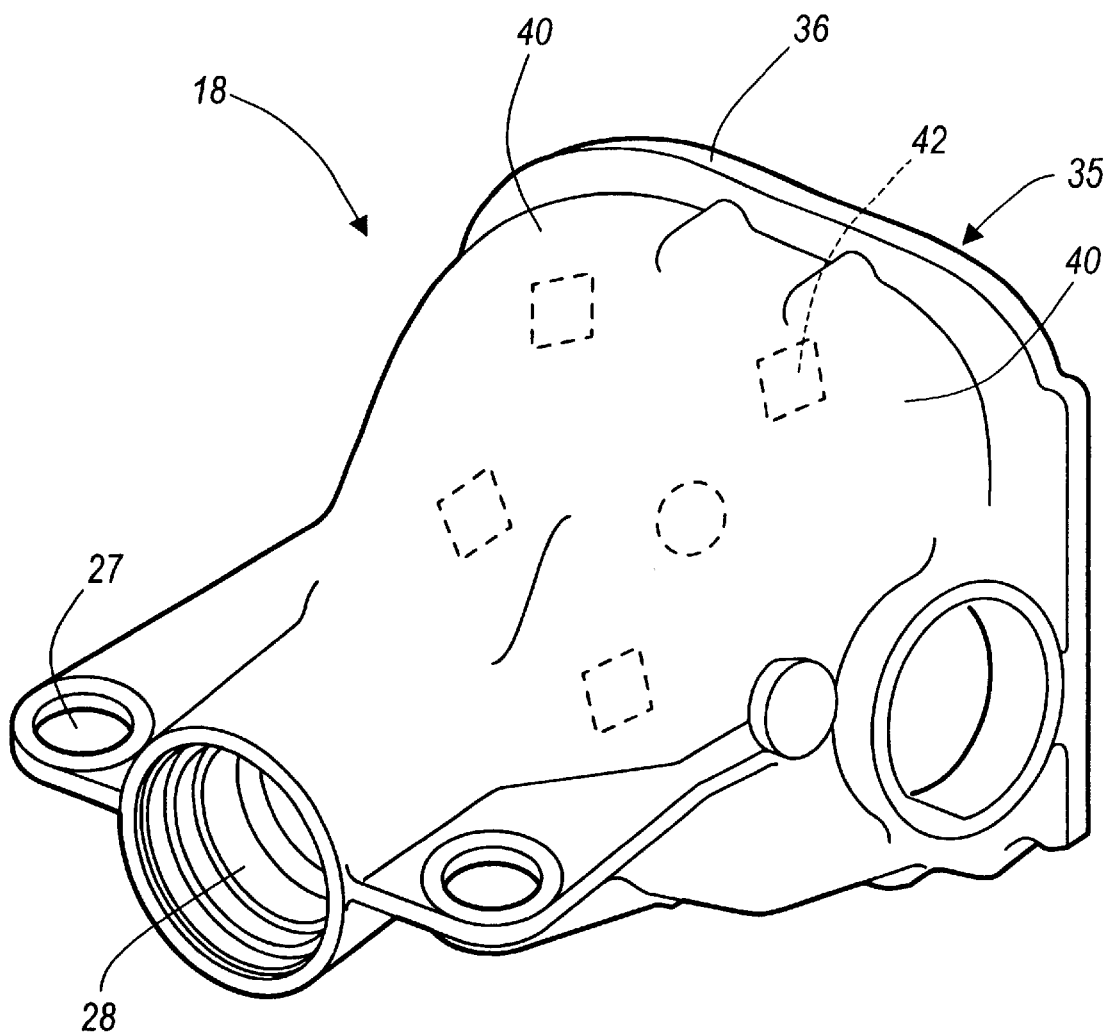
FIG. 3 is a top perspective view of the carrier in accordance with the teachings of the present invention.

As shown in FIG. 2, the axle assembly 10 includes two tubes 16 and a carrier 18, with the tubes 16 extending from each side of the carrier 18. The carrier 18 preferably houses a differential case 20. As shown in FIG. 3, the carrier 18 is preferably formed of a first portion 40 and a second portion 42. The first portion 40 is made of aluminum with ceramic particles reinforced in the aluminum matrix. The first 40 is preferably coupled to a cover 36. The cover 36 preferably holds the lubricants inside the carrier 18 and substantially prevents the lubricants from leaking the carrier 18. It is also preferable that the thermal expansion properties of the first portion 40 are low compared to carrier formed of a pure aluminum or cast iron. The low thermal expansion properties of the carrier 18 will prevent or reduce relative displacement of the carrier with respect to the gears thereby reducing the premature failure of the gears. Further, the low thermal expansion properties of the carrier 18 will ensure that when the carrier 18 is subject to high heat and stress, the cover 36 is not displaced or dislodged from the carrier 18. The second portion 42 of the carrier 18 is preferably made of unreinforced aluminum or substantially pure aluminum metal or an aluminum alloy. Preferably, the second portion 42 is present in the form of discrete pockets in the first portion 42. The second portion 42 is capable of being machined, to facilitate assembly of the axle 10 and such that the carrier 18 is capable of being connected to other components in the motor vehicle.

Although in the drawings a rear axle assembly from a non-independent suspension is generally shown and described, it must be understood that this invention is not limited to a carrier having a differential case installed in a rear axle assembly. It incorporates a carrier installed in drive axle assembly either in a front wheel drive, a rear wheel drive or in all wheel drive vehicles. Further, the carrier incorporating a differential case is shown and explained in detail, it must be understood that the carrier 18 may incorporate a power take off unit and have more than one output shafts. In addition, the carrier as described may also be used to support a skew axis gearset installed within a power takeoff unit. In general, the carrier 18 in accordance with the teachings of the present invention may be used to support any gearsets necessary to transfer the torque from the transverse axis of the engine and transmission to the longitudinal axis of the driveshaft.

As shown in FIG. 2 the carrier 18 houses a differential case 20, a first side gear 22, a second side gear 24. The differential case 20 is preferably coupled to an input shaft 30 (shown in FIG. 1), whereas the first side gear 22 and the second side gear 24 are coupled to an output shaft 32. Typically, the input shaft 30 transmits torque to the carrier 18 from the engine 12 or the transmission (as shown in FIG. 1) and the output shaft 32 transmits torque from the carrier 18 to the wheels 14. The carrier 18 also supports a ring gear 34 and a pinion gear 26. The pinion gear 26 transfers the rotational movement of the input shaft 30 into the rotational movement of the ring gear 34 about a perpendicular axis. The ring gear 34 is fixed to the differential case 20, and transfers rotational motion to the differential case 20.

The carrier 18 is also adaptable to receive a cover 36. The cover 36 preferably seals the carrier 18 and substantially prevents lubricants from leaking from the carrier 18. Additionally, the carrier 18 is adaptable to provide attachment for axle bearings 28 (as shown in FIG. 3). Further, the carrier 18 also includes mounting holes 27 to mount the carrier 18 and the axle housing 16 in the motor vehicle (as shown in FIG. 3). The carrier 18 may include other components such as a second pinion gear, a hydraulic conduit etc. Typically the differential case 20, the first side gear 22, the second side gear 24, the pinion gear 26 and the ring gear 34, are preferably made with conventional structural material, such as steel, and from conventional method. The cover 36 is preferably made from aluminum or steel.

Referring in particular to FIG. 3, the carrier 18 in accordance with the teachings of this invention is formed of a first portion 40 and a second portion 42. In the preferred embodiment, the second portion 42 is preferably integral with the first portion 40 such that the physical appearance of the first portion 40 and the second portion 42 are indistinguishable. Although in the drawing the second portion 42 is shown to be separate and distinct from the first portion, it must be understood this is only for illustration purposes.

The first portion 40 of the carrier 18 is formed of aluminum with ceramic particles reinforced in the aluminum matrix. The first portion 40 preferably forms from about 80% to 97% of the weight of the carrier 18. In order to obtain the desired physical properties of the carrier 18 the total percentage of the ceramic particles are in the range of 10% to 50% of the volume of the first portion 40 and preferably about 20% of the total volume of the first portion 40. Preferably, the ceramic particles used in forming the first portion 40 of the carrier 18 are selected from the group consisting of silicon carbide or aluminum oxide. In the preferred embodiment, the size of the ceramic particles is preferably in the range of about 4 microns to 30 microns. Preferably, the ceramic particles are in the range of 7 microns to 20 microns. The first portion 40 of the carrier 18 is adapted to receive the cover 36, such that the cover 36 snugly fits over the opening 35 of the carrier 18.

The second portion 42 of the carrier 18 is preferably formed of unreinforced aluminum. Preferably, the second portion 42 is formed of an aluminum alloy. Alternatively, the second portion 42 may also be formed of pure aluminum metal. The second portion 42 forms the remaining 20% to 3% of the weight of the carrier 18. The second portion 42 is preferably located between or encapsulated within the first portion 40, such that the first portion 40 has pockets of second portion 42. Alternatively, it also possible that a part of the carrier 18 is formed of the first portion 40 and the remaining part of the carrier 18 is formed of the second portion 42. In this case, it is preferred that the ceramic particles are uniformly distributed throughout the first portion 40. As will be explained later, the second portion 42 can be formed by more than one method Preferably, the second portion 42 is located in regions of the carrier 18 such that the carrier 18 is adapted to be welded or machined at the second portion 42.

Figure 4A:
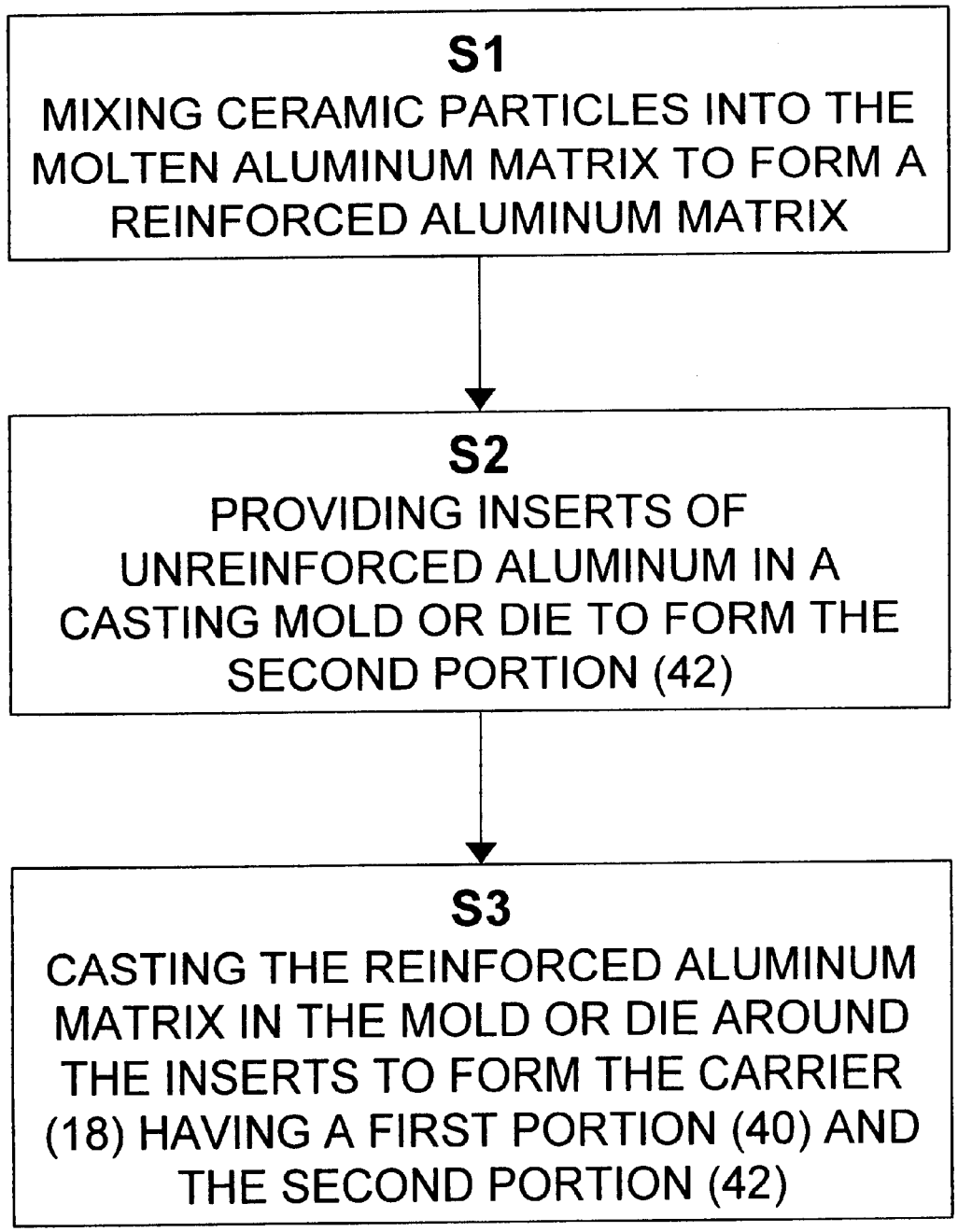
FIGS. 4a through 4c represent the processes of manufacturing the carrier in accordance with the teachings of the present invention.
Figure 4B:
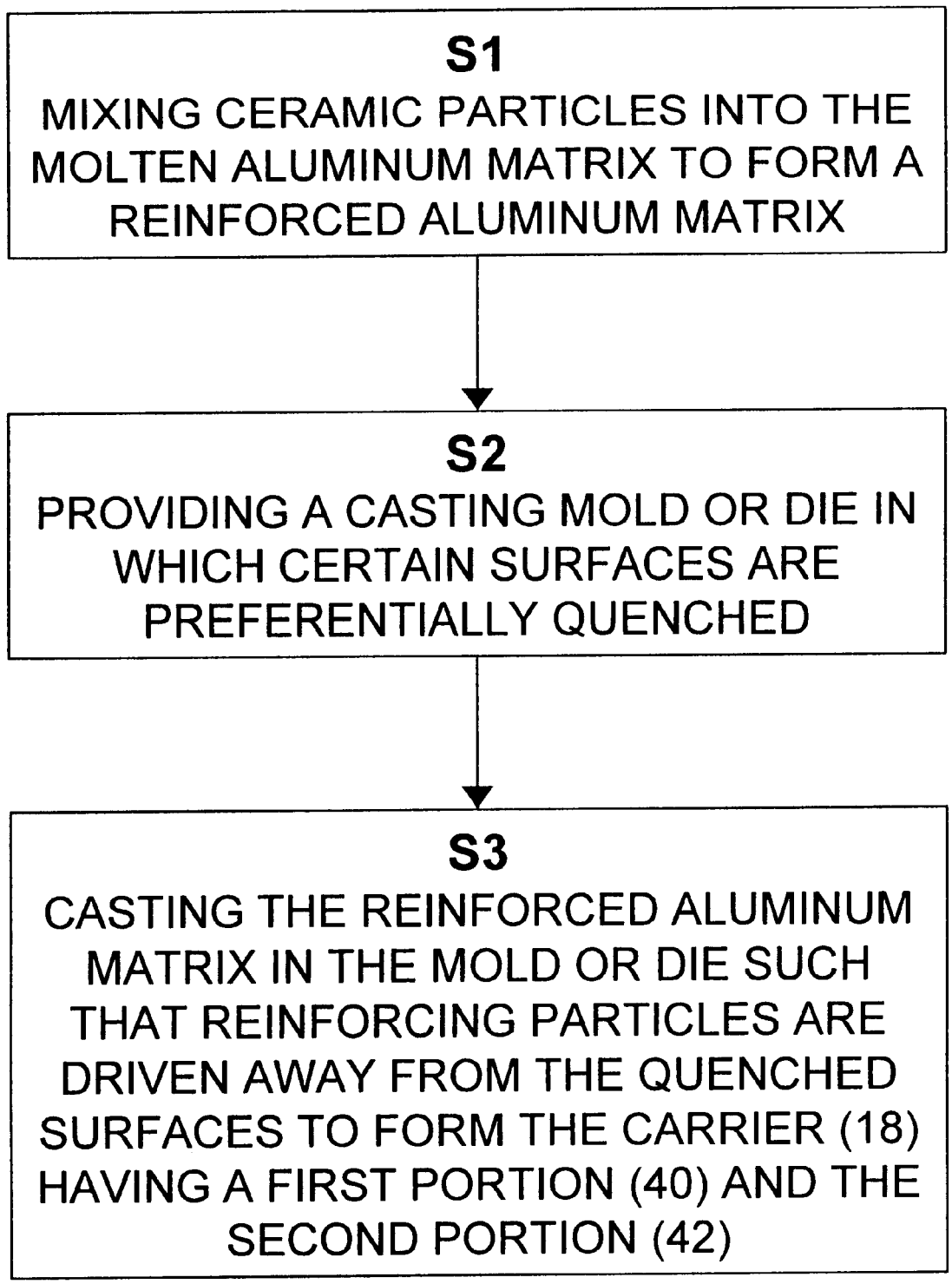
Figure 4C:
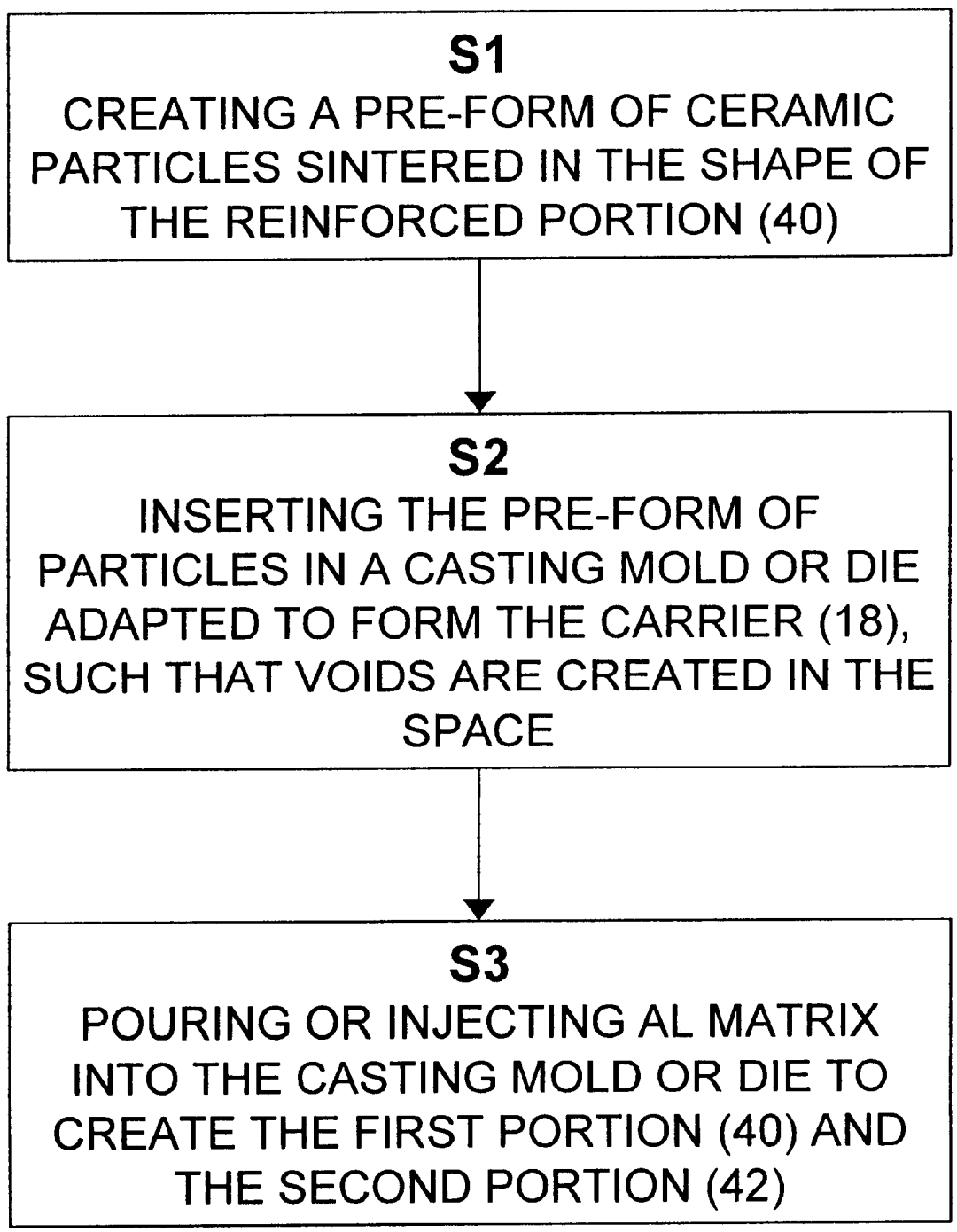

FIGS. 4a to 4c represent the processes of forming the first portion 40 and the second portion 42 of the carrier 18. The first process of forming the first portion 40 and the second portion 42 is shown in FIG. 4a. As shown the process starts at Step S1. In this step, the ceramic particles are added to molten aluminum. The process then shifts to step S2 where unreinforced aluminum consisting of either substantially pure aluminum or an aluminum alloy, in the shape of the second portion 42 are placed in the casting mold or die. Typically the mold or die will have the desired shape of the carrier 18. As represented in step S3 the second portion 42 is preferably formed by placing the piece of unreinforced aluminum in the casting mold or die before the mixture of ceramic particles and aluminum is poured or injected into the casting mold or die.

As shown in FIG. 4b the carrier 18 may also be formed by mixing ceramic particles into the molten aluminum as disclosed above to form the first portion 40, shown as step S1. Quenching certain surfaces in the casting mold or die, shown as step S2, forms the second portion 42. The quenched surfaces tend to repel particles during the casting process, thereby leaving pockets of unreinforced aluminum in the first portion 40 (shown as step S3). Another method of forming the carrier 18 is shown in FIG. 4c. In this process at step S1, the ceramic particles are bonded together either by sintering to the shape of the first portion 40, called the pre-form. The pre-form is then inserted into a casting mold or a die, where the casting mold or die is in the shape of the carrier 18. When the pre-form is inserted in the mold or die, voids are formed in the areas where the pre-form is not present. At step S3 molten aluminum is then poured or injected into the die, filling in spaces between the areas not otherwise filled by the pre-form.

The first portion 40 of the carrier 18 exhibits the following physical properties: yield strength in the range of 20 ksi to 52 ksi, preferably not less than 42 ksi; elastic modulus in the range of 13.2 to 16.5 Msi, preferably not less than 14.3 Msi; and a thermal expansion coefficient in the range of 6.5 ppm/F to 11.2, preferably not more than 9.7 ppm/F. The table below compares the physical properties of the first portion 40 of the carrier 18 of the present invention with other materials. The Al/SiC materials indicated in the table below are commercially available from Alcan Aluminum under the trade name of DURALCAN. The names indicated in the parenthesis in the table are different grades of DURALCAN that have been used to conduct the experiments. As can be seen from the chart below, the carrier 18 formed from reinforced aluminum (F3S.20S-T6) exhibits superior physical properties, in particular reduced thermal expansion compared to aluminum.

| Material | Modulus (Msi) | Thermal Expansion (ppm/F) | Yield (ksi) |
| --- | --- | --- | --- |
| Aluminum A356-T6 | 10.9 | 11.9 | 29 |
| Aluminum A357-T6 | 10.9 | 11.9 | 36 |
| Al/SiC Composite (F3S.10S-T6) | 12.5 | 11.5 | 41 |
| Al/SiC Composite (F3S.20S-0) | 14.3 | 9.7 | 24 |
| Al/SiC Composite (F3S.20S-T6) | 14.3 | 9.7 | 43 |
| Al/SiC Composite (F3S.20S-T71) | 14.3 | 9.7 | 31 |
| Cast Iron | 22 | 6.3 | 40 |

As any person skilled in the art will recognize from the previous description and from the figures and claims, modifications and changes can be made to the preferred embodiment of the invention without departing from the scope of the invention as defined in the following claims.

What is claimed is:

1. A carrier for supporting a gearset adaptable to transfer torque from the engine to the wheels in a motor vehicle, the carrier comprising:
   a first portion formed of an aluminum matrix, wherein the aluminum matrix is reinforced by ceramic particles, such that the ceramic particles are in the range of 10% to 50% of volume of the first portion; and
   a second portion formed of unreinforced aluminum metal, wherein the second portion is integral with the first portion;

wherein the second portion is adapted to attach the carrier to a support structure.

2. The carrier of claim 1, wherein the ceramic particles are 20% of the volume of the first portion.

3. The carrier of claim 1, wherein the ceramic particles are selected from a group consisting of silicon carbide or aluminum oxide.

4. The carrier of claim 1, wherein the ceramic particles have a particle size in the range of 4 microns to 30 microns.

5. The carrier of claim 4, wherein the particle size isin the range of 7 microns to 20 microns.

6. The carrier of claim 1, wherein the first portion forms 80% to 97% by weight of the carrier and the second portion forms 20% to 3% by weight of the carrier.

7. The carrier of claim 1, wherein the first portion has yield strength in the range of 20 ksi to 52 ksi.

8. The carrier of claim 7, wherein the first portion has the yield strength of not less than 42 ksi.

9. The carrier of claim 1, wherein the first portion has an elastic modulus in the range of 13.2 Msi to 16.5 Msi.

10. The carrier of claim 9, wherein the elastic modulus is not less than 14.3 Msi.

11. The carrier of claim 1, wherein the first portion has a thermal expansion coefficient in the range of 6.5 ppm/F. to 11.2 ppm/F.

12. The carrier of claim 11, wherein the thermal expansion coefficient is not more than 9.7 ppm/F.

13. The carrier of claim 1, wherein the first portion is attached to a cover adaptable to prevent leaking of a lubricant from the carrier.

14. The carrier of claim 1, wherein the second portion is formed as discrete pockets in the first portion.

* * * * *

UNITED STATES PATENT AND TRADEMARK OFFICE
CERTIFICATE OF CORRECTION

PATENT NO.    : 6,623,867 B2
DATED         : September 23, 2003
INVENTOR(S)   : Frank V. Crocco et al.

It is certified that error appears in the above-identified patent and that said Letters Patent is hereby corrected as shown below:

Column 6,
Line 6, after "6.5" delete "ppm/F." and substitute -- ppm/F -- in its place.

Signed and Sealed this

Thirteenth Day of January, 2004

JON W. DUDAS
*Acting Director of the United States Patent and Trademark Office*